(12) United States Patent
Hayashi et al.

(10) Patent No.: US 12,440,982 B2
(45) Date of Patent: Oct. 14, 2025

(54) ROBOT CONTROL DEVICE, ROBOT CONTROL METHOD, AND ROBOT CONTROL PROGRAM

(71) Applicant: OMRON Corporation, Kyoto (JP)

(72) Inventors: Kennosuke Hayashi, Kyoto (JP); Yohei Okawa, Kyoto (JP); Yoshihisa Ijiri, Kyoto (JP)

(73) Assignee: OMRON Corporation, Kyoto (JP)

( * ) Notice: Subject to any disclaimer, the term of this patent is extended or adjusted under 35 U.S.C. 154(b) by 219 days.

(21) Appl. No.: 18/274,194

(22) PCT Filed: Jan. 21, 2022

(86) PCT No.: PCT/JP2022/002177
§ 371 (c)(1),
(2) Date: Jul. 25, 2023

(87) PCT Pub. No.: WO2022/168634
PCT Pub. Date: Aug. 11, 2022

(65) Prior Publication Data
US 2024/0100698 A1 Mar. 28, 2024

(30) Foreign Application Priority Data
Feb. 5, 2021 (JP) .................... 2021-017687

(51) Int. Cl.
*B25J 9/16* (2006.01)
(52) U.S. Cl.
CPC ........... *B25J 9/1664* (2013.01); *B25J 9/1697* (2013.01)
(58) Field of Classification Search
CPC ...... B25J 9/1664; B25J 9/1697; B25J 9/1687; B25J 9/1656; G06Q 10/063; G06Q 50/04; G05B 2219/40034; G05B 2219/40111
See application file for complete search history.

(56) References Cited

U.S. PATENT DOCUMENTS

2011/0246130 A1  10/2011  Taguchi et al.
2011/0276307 A1  11/2011  Taguchi et al.
(Continued)

FOREIGN PATENT DOCUMENTS

CN  107505947 A  12/2017
CN  110576436 A  12/2019
(Continued)

OTHER PUBLICATIONS

Jean-Philippe Saut, Serena Ivaldi, Anis Sahbani, Philippe Bidaud, Grasping objects localized from uncertain point cloud data, Robotics and Autonomous Systems, vol. 62, Issue 12, 2014 (Year: 2014).*
Drigalski et al., "Contact-based in-hand pose estimation using Bayesian state estimation and particle filtering", IEEE International Conference on Robotics and Automation (ICRA), 2020, pp. 7294-7299.
Saut et al., "Grasping objects localized from uncertain point cloud data", Robotics and Autonomous Systems, vol. 62, 2014, pp. 1742-1754.
(Continued)

*Primary Examiner* — Thomas E Worden
*Assistant Examiner* — Christopher Scott
(74) *Attorney, Agent, or Firm* — Morgan, Lewis & Bockius LLP

(57) ABSTRACT

The observation update unit increases a weight of a particle for a particle representing a position and a posture closer to a position and a posture of an operation object indicated by an observation result, and increases a weight of a corresponding particle for a particle closer to a state in which an object of interest and the operation object arranged in a position and a posture represented by each of particles are in contact with each other in a virtual space where shapes and a relative positional relationship of the object of interest and the operation object are expressed in a case in which the observation result indicates that the contact has occurred.

7 Claims, 10 Drawing Sheets

(56) References Cited

U.S. PATENT DOCUMENTS

| | | |
|---|---|---|
| 2014/0365009 A1 | 12/2014 | Wettels |
| 2019/0375104 A1 | 12/2019 | Moriya et al. |
| 2020/0023521 A1* | 1/2020 | Dan .................. B25J 9/1692 |
| 2020/0164508 A1 | 5/2020 | Pajovic et al. |

FOREIGN PATENT DOCUMENTS

| | | |
|---|---|---|
| CN | 112060085 A | 12/2020 |
| JP | 2009-169581 A | 7/2009 |
| JP | 2010-060451 A | 3/2010 |
| JP | 2013-024864 A | 2/2013 |
| JP | 2016-528483 A | 9/2016 |
| JP | 2020-011339 A | 1/2020 |

OTHER PUBLICATIONS

Extended European Search Report issued in corresponding European Patent Application No. 22749509.0, dated Dec. 10, 2024.

International Search Report issued in corresponding International Application No. PCT/JP2022/002177 dated Apr. 5, 2022.

Written Opinion issued in corresponding International Application No. PCT/JP2022/002177 dated Apr. 5, 2022.

Kalashnikov, et al., "QT-Opt: Scalable Deep Reinforcement Learning for Vision-Based Robotic Manipulation," arXiv preprint arXiv:1806.10293 (2018).

Office Action issued in corresponding Chinese Patent Application No. 202280011668.9, dated Jun. 21, 2025.

\* cited by examiner

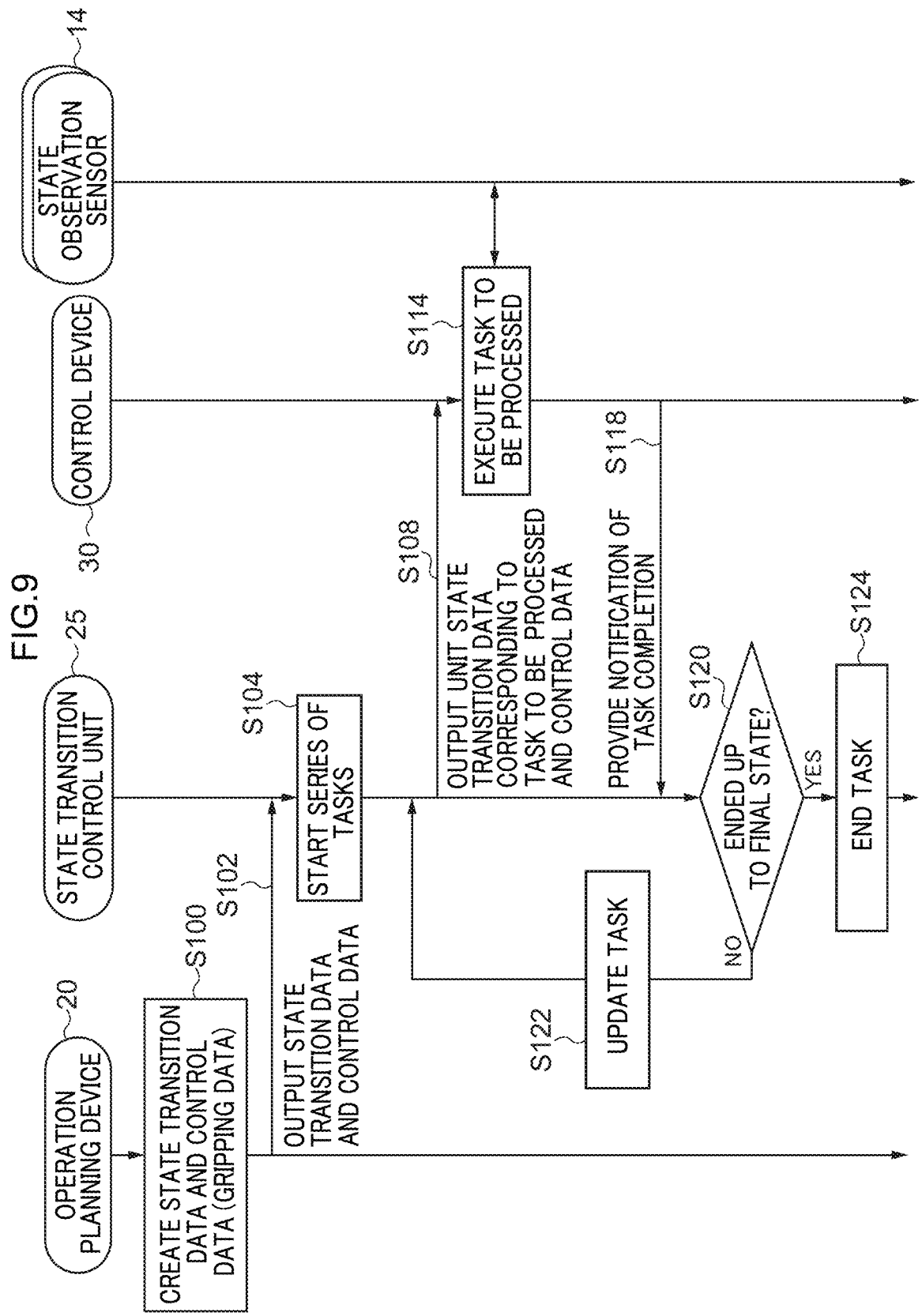

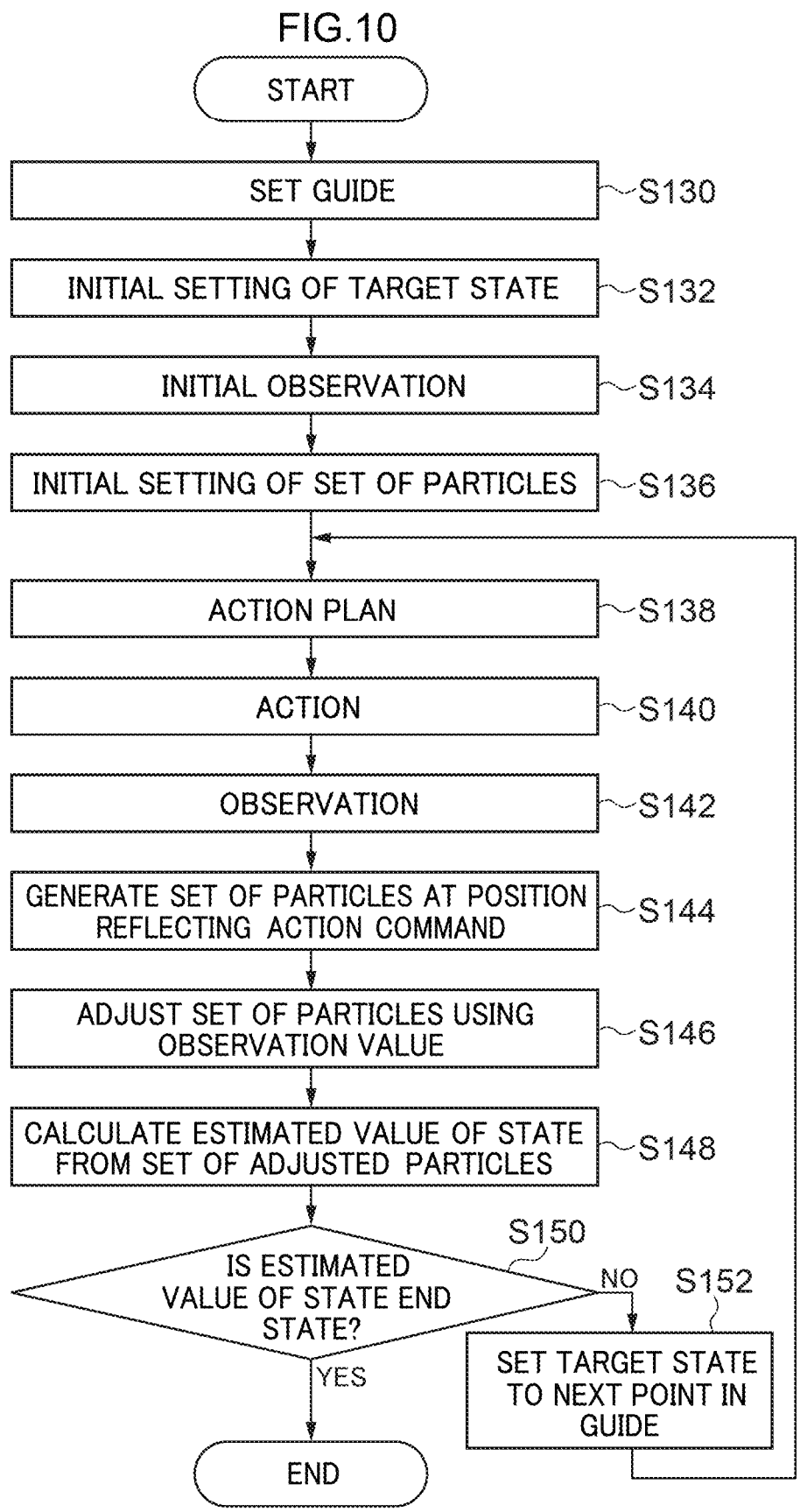

ROBOT CONTROL DEVICE, ROBOT CONTROL METHOD, AND ROBOT CONTROL PROGRAM

TECHNICAL FIELD

The present disclosure relates to a robot control device, a robot control method, and a robot control program.

BACKGROUND ART

Conventionally, in a case of operating a position and a posture of an object using a robot, it has been a condition that a relative position and posture between an end effector and a gripped object are known and do not change during operation, and a value of a target position and posture of the object in a robot coordinate system is known. In the robot control under the above condition, the robot does not pay attention to the position and posture of the gripped object during the control, and achieves the position and posture of the object to the target by performing a predetermined operation.

Furthermore, as a conventional technique, there is also a method of recognizing a position and a posture of an object by a visual observation action by a camera, and controlling a robot on the basis of the recognition. In the case of such a method, it is also possible to recognize a value of a target position and posture in the robot coordinate system by recognizing the position and posture of the object to be assembled.

Furthermore, there is also a technique related to motion generation of a robot that performs assembly work. For example, a method of causing a robot to learn a work to be executed using machine learning has been studied (Refer to Dmitry Kalashnikov, et al. "QT-Opt: Scalable Deep Reinforcement Learning for Vision-Based Robotic Manipulation" arXiv preprint arXiv: 1806.10293, 2018.). In this technique, a method of causing a robot to learn an operation of gripping a target object based on image data obtained from a camera by reinforcement learning has been proposed. According to this method, it is possible to automate at least a part of a series of processing of teaching the robot the operation of gripping the target object.

SUMMARY OF INVENTION

Technical Problem

However, in reality, the relative position and posture of the end effector and the gripping object are uncertain, and may change during operation. Moreover, the value of the target position and posture of the object in the robot coordinate system is uncertain. In particular, in a case in which a position and a posture of an object to be gripped or an object to be assembled are not determined with high accuracy by a jig, these uncertainties increase. Therefore, in the conventional technique, even if the robot itself is operated by a predetermined operation, the position and posture of the gripped object do not reach a target position and posture, and thus there is a problem that the operation of gripping and assembling an object to another object may fail.

Furthermore, in the recognition method by the camera, an error occurs in a sensor value due to factors such as quantization of an imager, fluctuation of the number of photons incident to one pixel, and illumination fluctuation, and thus, the recognized position and posture also includes an error. Therefore, even if the robot is controlled based on the recognized position and posture, it is difficult to control the robot so that the position and posture of the object reach the target state.

The present disclosure has been made in view of the above circumstances, and an object of the present disclosure is to provide a robot control device, a robot control method, and a robot control program that controls a robot so as to accurately operate an operation object.

Solution to Problem

A robot control device according to a first aspect of the present disclosure is a robot control device that controls a robot that operates an operation object to be operated to transition from a state in which the operation object is away from an object of interest located in an environment to a completion state in which the operation object is in contact with the object of interest in a specific manner, the robot control device including: a target state setting unit that sets an intermediate target state or the completion state as a target state of current movement, the intermediate target state being a target state in a middle of movement of the operation object until reaching the completion state; an observation unit that acquires an observation result by a sensor regarding a position and a posture of the operation object and presence or absence of contact between the operation object and the object of interest; a particle set setting unit that sets a set of particles representing uncertainty of the position and the posture of the operation object, each of the particles included in the set of particles representing one of possible positions and postures of the operation object; a particle set adjusting unit that increases a weight of a particle for a particle representing a position and a posture closer to a position and a posture of the operation object indicated by the observation result among the particles, and increases a weight of a corresponding particle for a particle closer to a state in which the object of interest and the operation object arranged in a position and a posture represented by each of the particles are in contact with each other in a virtual space where shapes and a relative positional relationship of the object of interest and the operation object are expressed in a case in which the observation result indicates that the contact has occurred; a state estimation unit that calculates an estimated state that is a position and a posture of the operation object estimated based on the set of particles in which a weight of each of the particles is adjusted; an action planning unit that plans an action for moving the operation object from the estimated state to the target state of the current movement; an action unit that commands the robot to execute the planned action; and a processing control unit that repeats setting of the target state, acquisition of the observation result, setting of the set of particles, adjustment of the set of particles, calculation of the estimated state, planning of the action, and execution of the action until the estimated state coincides with the completion state within a predetermined error.

A robot control method according to a second aspect of the present disclosure is a robot control method of controlling a robot that operates an operation object to be operated to transition from a state in which the operation object is away from an object of interest located in an environment to a completion state in which the operation object is in contact with the object of interest in a specific manner, the robot control method causing a computer to execute processing of: setting an intermediate target state or the completion state as a target state of current movement, the intermediate target state being a target state in a middle of movement of the operation object until reaching the completion state; acquiring an observation result by a sensor regarding a position and a posture of the operation object and presence or absence of contact between the operation object and the object of interest; setting a set of particles representing uncertainty of the position and the posture of the operation object, each of the particles included in the set of particles representing one of possible positions and postures of the operation object; increasing a weight of a particle for a particle representing a position and a posture closer to a position and a posture of the operation object indicated by the observation result among the particles, and increasing a weight of a corresponding particle for a particle closer to a state in which the object of interest and the operation object arranged in a position and a posture represented by each of the particles are in contact with each other in a virtual space where shapes and a relative positional relationship of the object of interest and the operation object are expressed in a case in which the observation result indicates that the contact has occurred; calculating an estimated state that is a position and a posture of the operation object estimated based on the set of particles in which a weight of each of the particles is adjusted; planning an action for moving the operation object from the estimated state to the target state of the current movement; commanding the robot to execute the planned action; and repeating setting of the target state, acquisition of the observation result, setting of the set of particles, adjustment of the set of particles, calculation of the estimated state, planning of the action, and execution of the action until the estimated state coincides with the completion state within a predetermined error.

A robot control program according to a third aspect of the present disclosure is a robot control program for controlling a robot that operates an operation object to be operated to transition from a state in which the operation object is away from an object of interest located in an environment to a completion state in which the operation object is in contact with the object of interest in a specific manner, the robot control program causing a computer to execute processing of: setting an intermediate target state or the completion state as a target state of current movement, the intermediate target state being a target state in a middle of movement of the operation object until reaching the completion state; acquiring an observation result by a sensor regarding a position and a posture of the operation object and presence or absence of contact between the operation object and the object of interest; setting a set of particles representing uncertainty of the position and the posture of the operation object, each of the particles included in the set of particles representing one of possible positions and postures of the operation object; increasing a weight of a particle for a particle representing a position and a posture closer to a position and a posture of the operation object indicated by the observation result among the particles, and increasing a weight of a corresponding particle for a particle closer to a state in which the object of interest and the operation object arranged in a position and a posture represented by each of the particles are in contact with each other in a virtual space where shapes and a relative positional relationship of the object of interest and the operation object are expressed in a case in which the observation result indicates that the contact has occurred; calculating an estimated state that is a position and a posture of the operation object estimated based on the set of particles in which a weight of each of the particles is adjusted; planning an action for moving the operation object from the estimated state to the target state of the current movement; commanding the robot to execute the planned action; and repeating setting of the target state, acquisition of the observation result, setting of the set of particles, adjustment of the set of particles, calculation of the estimated state, planning of the action, and execution of the action until the estimated state coincides with the completion state within a predetermined error.

Advantageous Effects of Invention

According to the robot control device, the robot control method, and the robot control program of the present invention, it is possible to control the robot so as to accurately operate the operation object.

BRIEF DESCRIPTION OF DRAWINGS

FIG. 9 is a sequence diagram illustrating a flow of a process of the control system of the present embodiment.

FIG. 10 is a flowchart illustrating a flow of control processing of the control device.

DESCRIPTION OF EMBODIMENTS

Figure 1:
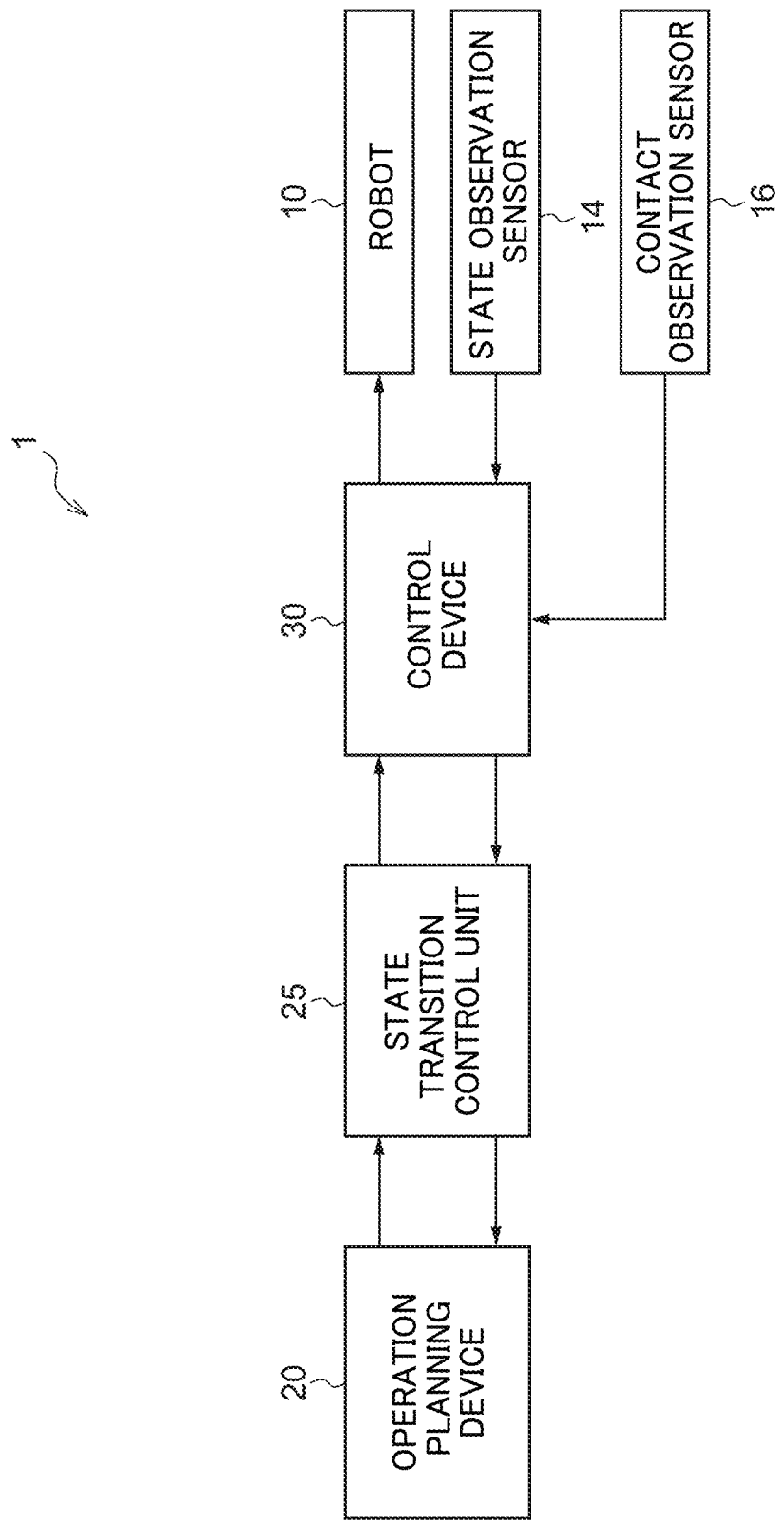
FIG. 1 is a diagram illustrating a configuration of a control system for controlling a robot according to the present embodiment.

Hereinafter, an example of an embodiment of the present disclosure will be described with reference to the drawings. Note that, in the drawings, the same or equivalent components and portions are denoted by the same reference signs. Furthermore, dimensional ratios in the drawings are exaggerated for convenience of description, and may be different from actual ratios.

FIG. 1 is a diagram illustrating a configuration of a control system for controlling a robot according to the present embodiment. As illustrated in FIG. 1, a control system 1 includes a robot 10, a state observation sensor 14, a contact observation sensor 16, an operation planning device 20, a state transition control unit 25, and a control device 30. Note that the state transition control unit 25 may be a part of the operation planning device 20 or a part of the control device 30, or may be configured as a device independent of both the operation planning device 20 and the control device 30 as in the present embodiment.

(Robot)

Figure 2:
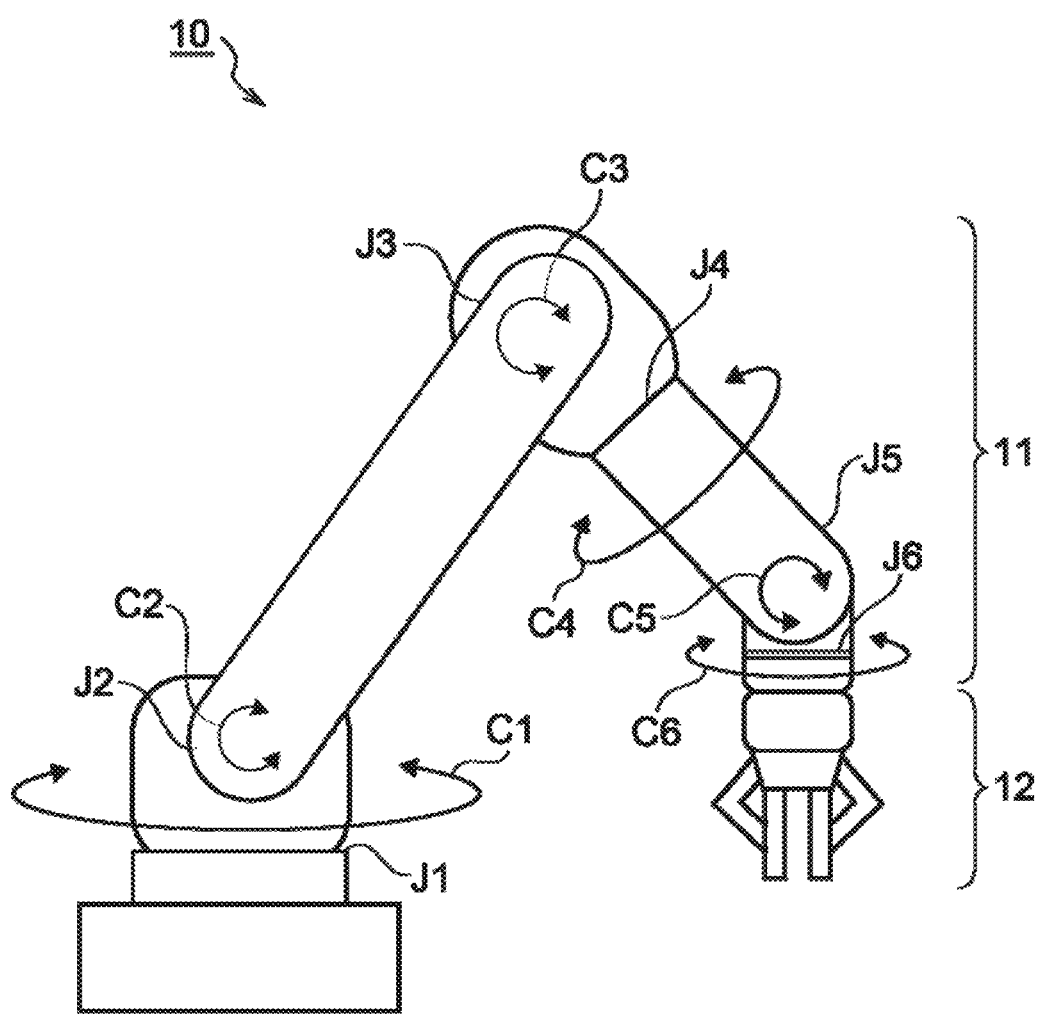
FIG. 2 is a diagram illustrating a schematic configuration of a robot as an example of a control target.
Figure 3:
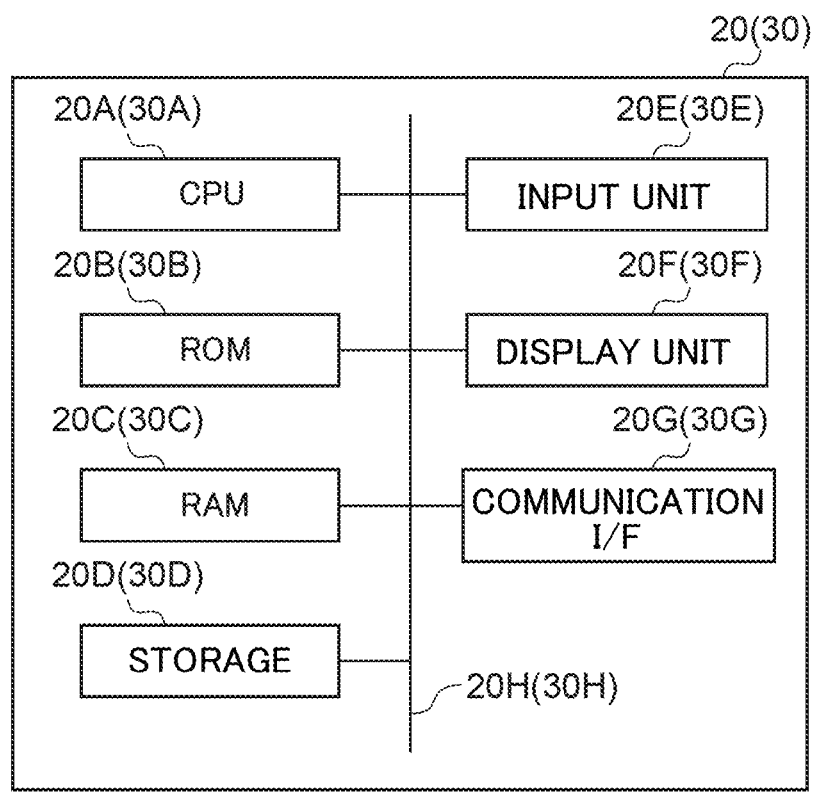
FIG. 3 is a block diagram illustrating a hardware configuration of an operation planning device and a control device.

FIGS. 2 and 3 are diagrams illustrating a schematic configuration of the robot 10. The robot 10 in the present embodiment is a six-axis vertical articulated robot, and an end effector 12 is provided at a distal end 11a of an arm 11 via a flexible portion 13. The robot 10 grips a component by the end effector 12 to perform assembly work of an assembly. In the example of FIG. 3, the end effector 12 is configured to have a hand of one set of clamping portions 12a, but a component may be sucked using the end effector 12 as a suction pad. In the following description, the component is gripped including suction of the component. It may be paraphrased as holding the component including gripping and sucking the component.

As illustrated in FIG. 2, the robot 10 has the arm 11 with six degrees of freedom provided with joints J1 to J6. The joints J1 to J6 rotatably connect the links to each other in directions of arrows C1 to C6, respectively, by a motor (not illustrated). A gripper as an end effector 12 is connected to the distal end of the arm 11. Here, a vertical articulated robot has been described as an example, but a horizontal articulated robot (scalar robot) may be used. Furthermore, although the six-axis robot has been described as an example, an articulated robot having another degree of freedom such as a five-axis robot or a seven-axis robot may be used, or a parallel link robot may be used.

(State Observation Sensor)

The state observation sensor 14 observes the state of the robot 10, and outputs the observed data as state observation data. As the state observation sensor 14, for example, an encoder of a joint of the robot 10, a visual sensor (camera), motion capture, a force-related sensor, or the like is used. As the state of the robot 10, a position and a posture of the distal end 11a of the arm 11 can be specified from an angle of each joint, and a posture of a component (work object) can be estimated from the visual sensor and/or the force-related sensor. In a case in which a marker for motion capture is attached to the end effector 12, a position and a posture of the end effector 12 can be specified as the state of the robot 10, and the posture of the component (work object) can be estimated from the position and posture of the end effector 12.

The force-related sensor is a generic term for a force sensor and a torque sensor, and is a generic term including a tactile sensor in a case in which the sensor is provided at a portion in contact with a component. The force-related sensor may be provided on a surface of a portion where the end effector 12 grips a component or at an articulated portion within the end effector 12 so that the sensor detects a force that the end effector of the robot 10 receives from the component. The force-related sensor is, for example, a sensor that detects a one-element or multi-element, one-axis, three-axis, or six-axis force as the state of the robot 10. By using the force-related sensor, how the end effector 12 grips the component, that is, the posture of the component can be grasped more accurately, and appropriate control can be performed.

Furthermore, the position and posture of the end effector 12 itself and the component gripped by the end effector 12 can also be detected as the state of the robot 10 by the visual sensor.

As described above, the states of the end effector 12 and the gripped components can be detected by the various sensors which are the state observation sensors 14. Furthermore, detection results of the various sensors can be acquired as state observation data.

(Contact Observation Sensor)

The contact observation sensor 16 is a pressure sensor, a force sensor, or a tactile sensor. The tactile sensor is a sensor that detects a pressure distribution, or a sensor that can detect a force in orthogonal three-axis directions and a moment around the orthogonal three axes. The pressure sensor and the tactile sensor are provided, for example, at a portion of a finger of the end effector 12 that comes into contact with an object to be gripped. The force sensor is provided, for example, at a wrist portion between the arm 11 and the end effector 12 of the robot 10.

(Operation Planning Device/Control Device)

Next, configurations of the operation planning device 20 and the control device 30 will be described.

FIG. 3 is a block diagram illustrating a hardware configuration of the operation planning device 20 and the control device 30 according to the present embodiment. The operation planning device 20 and the control device 30 can be realized by a similar hardware configuration. The operation planning device 20 includes a central processing unit (CPU) 20A, a read only memory (ROM) 20B, a random access memory (RAM) 20C, a storage 20D, an input unit 20E, a display unit 20F, and a communication interface (I/F) 20G. The respective components are communicably connected to each other via a bus 20H. The control device 30 includes a CPU 30A, a ROM 30B, a RAM 30C, a storage 30D, an input unit 30E, a display unit 30F, and a communication I/F 30G. The respective components are communicably connected to each other via a bus 30H. Hereinafter, the case of the operation planning device 20 will be described.

In the present embodiment, a program is stored in the ROM 20B or the storage 20D. The CPU 20A is a central processing unit, and executes various programs and controls each configuration. That is, the CPU 20A reads the program from the ROM 20B or the storage 20D, and executes the program using the RAM 20C as a work area. The CPU 20A performs control of each of the above-described configurations and various types of arithmetic processing according to the program recorded in the ROM 20B or the storage 20D.

The ROM 20B stores various programs and various data. The RAM 20C temporarily stores a program or data as a work area. The storage 20D includes a hard disk drive (HDD), a solid state drive (SSD), or a flash memory, and stores various programs including an operating system and various data.

The input unit 20E includes a keyboard and a pointing device such as a mouse, and is used to perform various inputs. The display unit 20F is, for example, a liquid crystal display, and displays various types of information. The display unit 20F may adopt a touch panel system and function as the input unit 20E.

The communication interface (I/F) 20G is an interface for communicating with other devices, and for example, standards such as Ethernet (registered trademark), FDDI, or Wi-Fi (registered trademark) are used.

Figure 4:
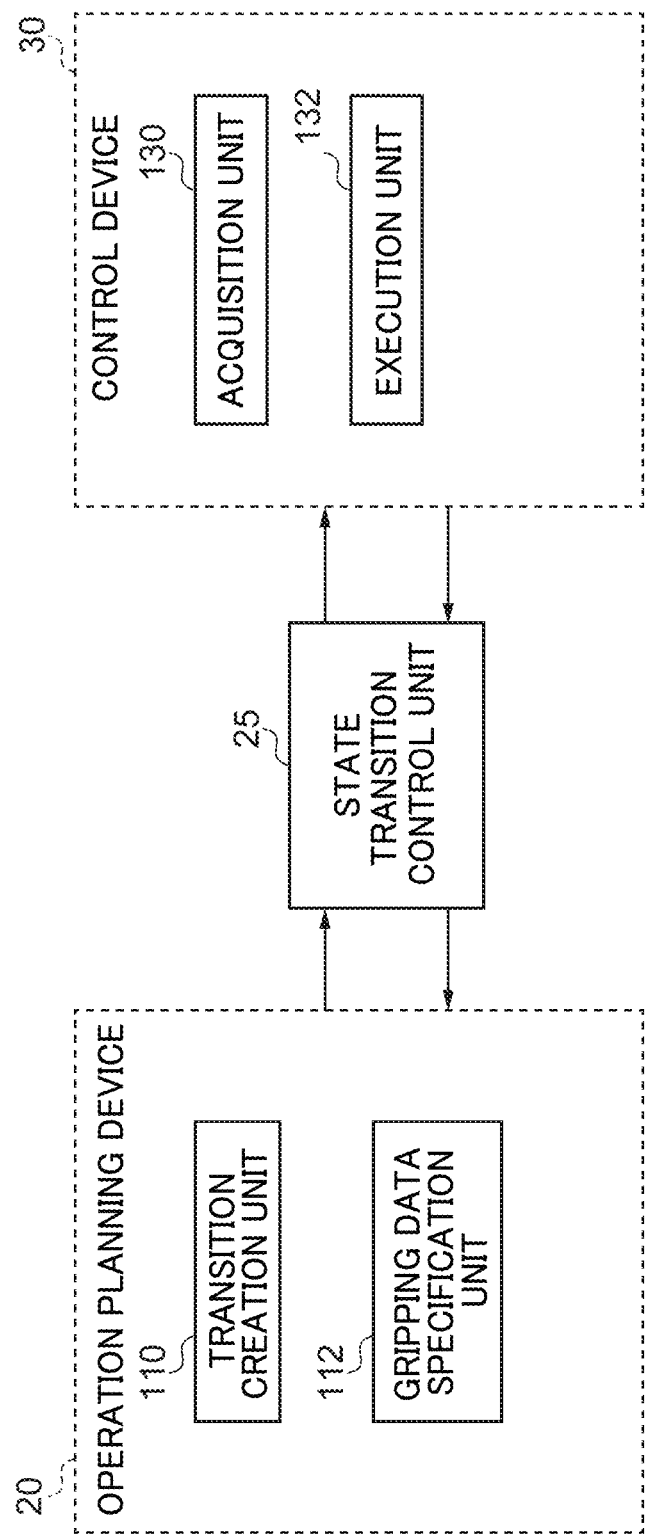
FIG. 4 is a block diagram illustrating an example of a functional configuration of the operation planning device and the control device.

FIG. 4 is a block diagram illustrating an example of a functional configuration of the operation planning device 20 and the control device 30. Note that the operation planning device 20 and the control device 30 may be integrally configured.

As illustrated in FIG. 4, the operation planning device 20 includes a transition creation unit 110 and a gripping data specification unit 112 as functional configurations. Each functional configuration of the operation planning device 20 is realized by the CPU 20A reading a program stored in the ROM 20B or the storage 20D, developing the program in the RAM 20C, and executing the program. The control device 30 includes an acquisition unit 130 and an execution unit 132 as functional configurations. Each functional configuration of the control device 30 is realized by the CPU 30A reading a program stored in the ROM 30B or the storage 30D, developing the program in the RAM 30C, and executing the program.

In the present embodiment, an assembly process by work of the robot 10 is represented by a state transition diagram. In the overall state transition diagram, components or assemblies are disassembled into element units, and data representing transitions of the elements is represented as unit state transition data.

The operation planning device 20 creates each piece of unit state transition data as an operation plan, and receives registration information necessary for creating the unit state transition data by an input from a user. The registration information is various types of information such as component information (ID, type, and the like of a component), CAD information for each type of the end effector 12, an assembly procedure (including a disassembly procedure), and a gripping position (including a posture) of the component. Note that the assembly procedure includes relative trajectories of components recorded at the time of assembly (or disassembly) in simulation.

The transition creation unit 110 creates state transition data including each of the unit state transition data. Each of the unit state transition data is created from the assembly procedure of the registration information.

For example, the transition creation unit 110 creates unit state transition data representing a transition from a state in which a first element and a second element exist independently to a state in which a third element that is an assembly including the first element and the second element is assembled. The first element is a component or an assembly. The second element is also a component or an assembly.

Figure 5:
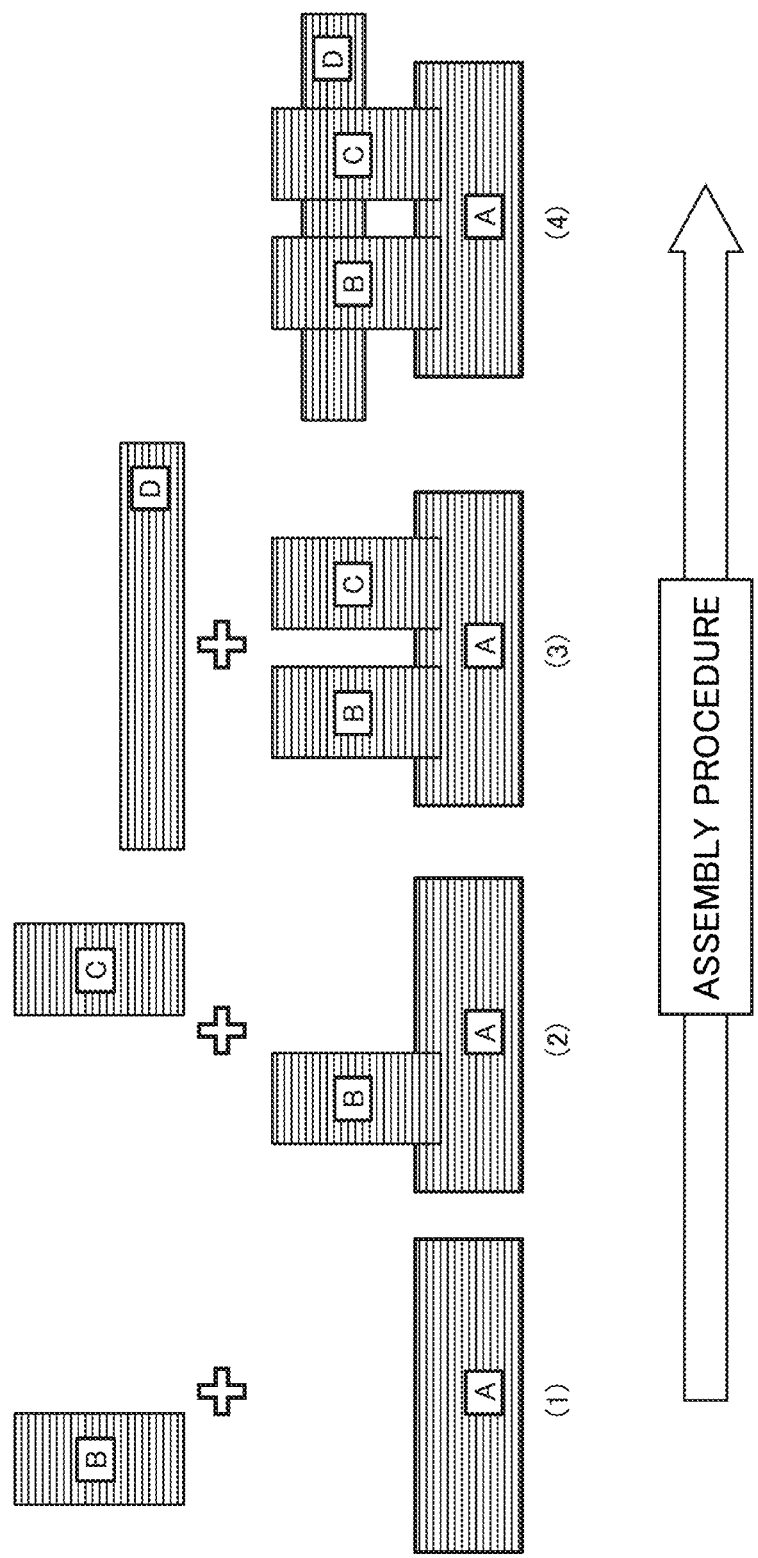
FIG. 5 is a diagram illustrating an example of an assembly procedure using components A to D.

Before describing the gripping data specification unit 112, a specific example of an assembly procedure corresponding to the state transition data will be described. FIG. 5 is a diagram illustrating an example of an assembly procedure using components A to D. When applied to the state transition, each of (1) to (3) corresponds to an initial state included in the unit state transition data. (1) When the work process of assembling the components A and B is applied to the unit state transition data, the components A and B correspond to the first element and the second element, respectively, and the assembly of (2) in which the components A and B are assembled corresponds to the third element. The third element is a target state included in the unit state transition data having (1) as an initial state. (2) and later can be similarly applied to the unit state transition data. Hereinafter, the gripping data specification unit 112 will be described using the assembly procedure of the components A to D as an example.

The gripping data specification unit 112 specifies gripping data for each of the unit state transition data based on the gripping position of the component in the registration information. The gripping data specification unit 112 specifies gripping data when the end effector 12 of the robot 10 grips the first element or the second element that is an object to be gripped for assembly. The gripping data is a planned value of the relative position and posture of the end effector 12 and the object to be gripped when the end effector 12 grips the object to be gripped. Hereinafter, the relative position and posture in the gripping data will be described. Here, the planned value of the relative position and posture is a planned value of the gripping position and the gripping posture when the end effector 12 grips the element. Furthermore, the other element with respect to the element set as the object to be gripped is an incorporation destination target object. Furthermore, the position and posture are represented by six degrees of freedom.

Figure 6A:
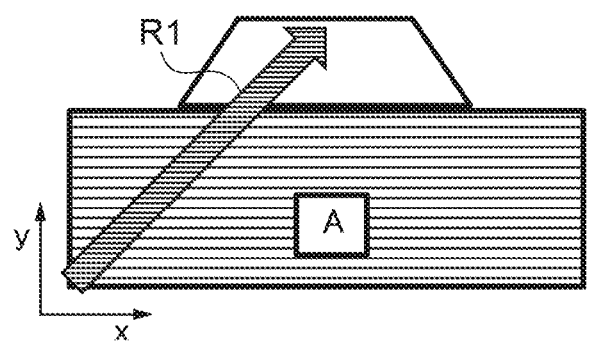
FIG. 6 is a diagram illustrating an example of relative positions of gripping data.
Figure 6B:
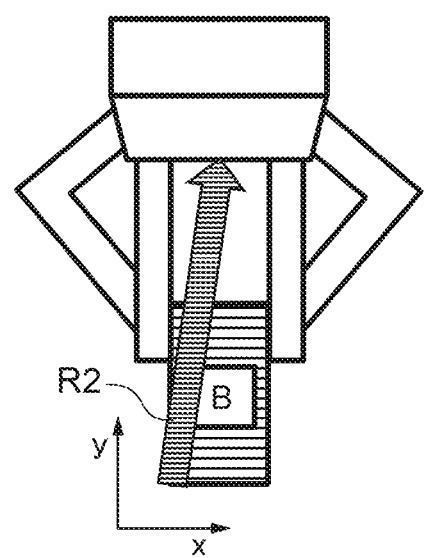

FIG. 6 is a diagram illustrating an example of the relative position and posture of the gripping data. In FIG. 6(A), in a case in which the end effector 12 is a suction pad, a relative position and posture R1 of the end effector 12 with respect to the component A is represented as an arrow. FIG. 6(A) illustrates the relative position and posture R1 of the end effector 12 with respect to the component A in a case in which the end effector 12 is a suction pad. FIG. 6(B) illustrates a relative position and posture R2 of the end effector 12 with respect to the component B in a case in which the end effector 12 is a gripper (hand) including a set of clamping portions. The component C and the component D are similarly represented.

The relative position and posture can be obtained by the following formula.

$$(T^{obj \to tcp})^{-1} = T^{tcp \to obj}$$

The left side represents a component coordinate system, and the right side represents the relative position and posture (position and posture) from the end effector 12. The gripping data is calculated, for example, as a planned value of CAD data with identification ID of the end effector 12 to be used at the time of gripping and a target relative position and posture of the object to be gripped. The planned value of the relative position and posture may be input by the user who is an administrator while being included in a component gripping position (position to be gripped on a component surface) of the registration information, or may be automatically calculated by an existing method such as a gripping plan.

The operation planning device 20 outputs the created unit state transition data and gripping data as control data to the state transition control unit 25. One state transition represented by the unit state transition data is also referred to as task. Note that all the unit state transition data and the control data included in the state transition data may be output to the state transition control unit 25 instead of being output from the operation planning device 20 every time a task is updated, and which unit state transition data is output may be managed on a side of the state transition control unit 25. Furthermore, the gripping data may be directly output to the control device 30 without passing through the state transition control unit 25, and managed on a side of the control device 30.

The state transition control unit 25 outputs unit state transition data corresponding to a task to be processed in the state transition data to the execution unit 132 of the control device 30. The processing target is designated at the start of the assembly work, and is updated each time a notification of task completion is received from the control device 30. The state transition control unit 25 may be included in the operation planning device 20, may be included in the control device 30, or may be a device different from any of them. Furthermore, the entire control system including the operation planning device 20, the control device 30, and the state transition control unit 25 may be one device.

Hereinafter, each processing unit of the control device 30 will be described.

The acquisition unit 130 acquires the unit state transition data and the gripping data of the processing target from the state transition control unit 25. Furthermore, the acquisition unit 130 acquires state observation data obtained by observing the position of the first element and the position of the second element from the state observation sensor 14. Note that the position of the first element and the position of the second element include a posture.

Furthermore, the acquisition unit 130 acquires contact observation data that is a sensor value obtained from the contact observation sensor 16.

The execution unit 132 executes a task using the unit state transition data output from the state transition control unit 25. The task is, for example, a task of completing a state in which the third element is assembled in the unit state transition data. The execution unit 132 causes the end effector 12 to grip the object to be gripped, which is one of the first element and the second element, based on the observation data and the gripping data by execution of the task, and relatively moves the object to be gripped with respect to the other element along a target relative trajectory including a guide to be described later in a final portion.

A specific execution method of the task of the execution unit 132 will be described below.

Here, a problem of operating the relative position and posture of two objects by the operation of the robot 10 will be considered.

Here, an object located in the environment is referred to as object of interest, and an object operated by the robot 10 using the end effector 12 is referred to as operation object. As a premise, CAD models of both objects are given, and it is assumed that both objects are rigid bodies and there is no error between the CAD model and the actual object shape. Furthermore, it is assumed that the position and posture of the object of interest do not change due to some external force. It is assumed that the relative position and posture which are the completion states of the object of interest and the operation object are given as unit state transition data of the task.

In the case of a task of assembling a gripped component to another component, the object of interest is a component to be assembled, and the operation object is a gripped component. The completion state is relative position and posture in which the gripped component is assembled to the assembling destination.

In the case of a task of transferring a gripped component to another position in the environment, the object of interest is a landmark in the environment, and the operation object is a gripped component. The completion state is relative position and posture of a desired movement destination position from the landmark.

The relative position and posture of the object of interest and the operation object are recognized by visual observation using the state observation sensor 14. For example, using an image obtained from a camera that is the state observation sensor 14 and each CAD model, the position and posture of each of the object of interest and the operation object in a camera coordinate system are recognized by CAD matching. Using the two positions and postures, the position and posture of the CAD origin of the operation object viewed from the CAD origin of the object of interest are set as the relative position and posture. Note that, as described above, since an error occurs in the position and posture of each object observed in the camera coordinate system, the obtained relative position and posture also includes an error. The deviation between the true value and the observation value of the relative position and posture is referred to as observation noise of the system. Note that, since there is no means to know the true value of the relative position and posture, the observation noise is also conceptual, and the value cannot be obtained. The observation value of the relative position and posture of the object of interest and the operation object may be acquired by processing an image captured by the camera, or may be acquired by calculation based on an angle of each joint of the robot 10 measured by an encoder after the robot 10 grips the operation object in a case in which calibration has been performed with the observation value by the camera.

Furthermore, the contact between the object of interest and the operation object is recognized from a pressure sensor, a force sensor, or a tactile sensor which is the contact observation sensor 16. In the present embodiment, it is assumed that the contact observation value of the contact observation sensor 16 has no error, and whether or not the contact has been made can be accurately observed.

When the robot 10 is controlled to change the relative position and posture by moving the operation object by a commanded movement amount while the end effector 12 grips the operation object, an amount of change in the relative position and posture, which is an amount of actual movement of the operation object, is different from the commanded movement amount. For example, there may be a case where an error occurs in the movement amount itself of a TCP (tool center point) due to an error in the attachment position of the robot 10 or a computation error of forward kinematics. Since a certain pre-calibration is performed in the actual use scene of the robot 10, the magnitude of these errors is usually small, but an operation requiring high accuracy such as an insertion operation still fails even if there is a slight error. Alternatively, in a case in which the position and posture of the operation object with respect to the end effector 12 are observed immediately after gripping and are not observed again thereafter, there may be a case where the position and posture of the operation object with respect to the end effector 12 change due to insufficient gripping force while the operation object is moved to a guide start point after the observation. Moreover, when an external force is applied to the operation object such as contact of the operation object with the object of interest while the operation object is moved along the guide described later, the position and posture of the operation object with respect to the end effector 12 may change. In any case, if there are these errors, the operation object cannot be moved by the commanded movement amount. The deviation of the actual movement amount from the commanded movement amount is referred to as system noise of the system.

Here, relative position and posture of the operation object viewed from the object of interest are set as a state s, and a state $s_t$ at discrete times t=0, 1, ..., M is a target to be considered. The coordinate system of the state s is an object coordinate system that is a relative coordinate system based on the object of interest. Furthermore, the position and posture of TCP in the robot coordinate system at time t are $x_t$, and a homogeneous transformation matrix of the position and posture of $x_t$ and $s_t$ is $T_t$.

The transformation of the position and posture is described in Formula (1). $s_t$, $T_t$, and $x_t$ are a homogeneous coordinate system.

$$s_t = T_t x_t \quad (1)$$

As is clear from Formula (1), the homogeneous transformation matrix $T_t$ includes not only the transformation of the position and posture of the TCP from the robot coordinate system to the object coordinate system but also the transformation of the relative position and posture of the TCP to the relative position and posture of the operation object. That is, while $x_t$ is the position and posture of the TCP, the state $s_t$, which is a result of transformation of $x_t$ by $T_t$, is not the relative position and posture of the TCP but the relative position and posture of the operation object.

Note that the state $s_t$ and the position and posture $x_t$ of the TCP are a matrix of four rows and four columns, the components of the upper left three rows and three columns represent a rotation matrix, and the first to third row of the fourth column can be treated as a position vector. The fourth column, the fourth row is a component for handling infinity. Since the rotation matrix has only three-dimensional information in nature, these matrices can be treated as substantially six dimensions. The homogeneous transformation matrix $T_t$ is also a matrix of four rows and four columns. The product of the two matrices in the homogeneous coordinate system notation corresponds to addition of the position and posture expressed by a vector.

Now, it is considered that the robot 10 grips the operation object by the end effector 12.

A system in which the position and posture of the TCP transition to $x_{t+1}$ at time t+1 by applying a control amount $u_t$ to the position and posture $x_t$ of the TCP at certain time t is considered. At this time, since the operation object is gripped by the end effector 12, the operation object transitions from the state $s_t$ to the state $s_{t+1}$ with the operation. A movement amount of the relative position and posture in the object coordinate system changed by the control amount $u_t$ is set as $a_t$. However, it is assumed that a gripping posture of the operation object can change by noise $v_t$ during the movement, and the movement amount in which $v_t$ affects at is considered as a net movement amount of the operation object.

It is assumed that $v_t$ is system noise of the system, and the system noise $v_t$ follows a certain probability distribution Pv. Note that $v_t$ is also a homogeneous coordinate system.

Furthermore, since the gripping posture changes by $v_t$ during the operation, the homogeneous transformation matrix $T_t$ of $s_t$ and $x_t$ changes by $v_t$. The changed homogeneous transformation matrix is as follows.

$$T_{t+1} = v_t T_t$$

The state equation of the system is described in Formula (2) as a description of matrix operation. $v_t$, $u_t$, and at are a homogeneous coordinate system.

$$\begin{cases} x_{t+1} = u_t x_t \\ s_{t+1} = v_t a_t s_t \end{cases} \quad (2)$$

$$v_t \sim \mathcal{P}_v \quad (3)$$

From Formulas (1) and (2), Formula (4) is obtained as a relationship between $v_t a_t$ and $u_t$.

$$T_{t+1} x_{t+1} = v_t a_t T_t x_t$$

$$T_{t+1} x_{t+1} x_t^{-1} T_t^{-1} = v_t a_t$$

$$v_t a_t = T_{t+1} u_t T_t^{-1} \quad (4)$$

Next, an observation action by the state observation sensor 14 and the contact observation sensor 16 will be considered. It is assumed that an observation value $y_t$ is obtained by the observation action. The observation value $y_t$ includes an observation value $s_t'$ of the state and a contact observation value $c_t'$.

$$y_t = (s_t', c_t')$$

$s_t'$ is an observation value of the relative position and posture in the object coordinate system. However, it is assumed that $s_t'$ has an error from the true value $s_t$ due to observation noise ω. $c_t'$ is a contact observation value between the object of interest and the operation object. It is assumed that no error occurs in the observation of $c_t'$. $c_t'=0$ in a case in which the object of interest and the operation object are not in contact, and $c_t'=1$ in a case in which the object of interest and the operation object are in contact.

It is assumed that $\omega_t$ is an observation noise of a system, and the observation noise $\omega_t$ follows a certain probability distribution Pω. Note that $\omega_t$ is also a homogeneous coordinate system.

The observation equation is described in Formula (5) in the form of a homogeneous coordinate system.

$$s_t' = \omega_t s_t \quad (5)$$

$$\omega_t \sim \mathcal{P}_\omega \quad (6)$$

From the above, a state space model is defined as follows.

$$\begin{cases} s_{t+1} = v_t a_t s_t \\ s_t' = \omega_t s_t \end{cases} \quad (7)$$

The state space model is described as a probability model in Formula (8).

$$\begin{cases} s_{t+1} \sim p(s_{t+1}|s_t, a_t) \\ y_t \sim p(y_t|s_t) \end{cases} \quad (8)$$

A set of observation values when time transitions a certain time t is given as follows.

$$y_{0:t} = \{y_m | m=0,1, \ldots, t\}$$

The probability that $s_t$ is obtained when $y_{0:t}$ is given is expressed by the following Formula (9).

$$\begin{aligned} p(s_t|y_{0:t}) &= \frac{p(s_t, y_{0:t})}{p(y_{0:t})} \\ &= \frac{p(y_t|s_t)p(s_t|y_{0:t-1})}{p(y_t|y_{0:t-1})} \\ &= \frac{p(y_t|s_t)}{p(y_t|y_{0:t-1})} \int p(s_t, s_{t-1}|y_{0:t-1}) ds_{t-1} \\ &= \frac{p(y_t|s_t)}{p(y_t|y_{0:t-1})} \int p(s_t|s_{t-1}, y_{0:t-1}) p(s_{t-1}|y_{0:t-1}) ds_{t-1} \\ &= \eta p(y_t|s_t) \int p(s_t|s_{t-1}) p(s_{t-1}|y_{0:t-1}) ds_{t-1} \end{aligned} \quad (9)$$

However, $\eta = 1/p(y_t|y_{0:t-1})$

The state is controlled from the state space model of Formula (8) and the probability of obtaining the state when the observation of Formula (9) is obtained. That is, the robot 10 operates the relative position and posture between the two objects.

In accordance with the task execution method described above, for the task, the execution unit 132 controls the robot 10 that operates an operation object to be operated to transition from an initial state in which the operation object is away from an object of interest located in an environment to a completion state in which the operation object is in contact with the object of interest in a specific manner. The execution unit 132 controls the robot 10 for each task.

Here, the task is a task of assembling the gripped component to another component, a task of transferring the gripped component to another position in the environment, or a task of gripping a later-described component.

Figure 7:
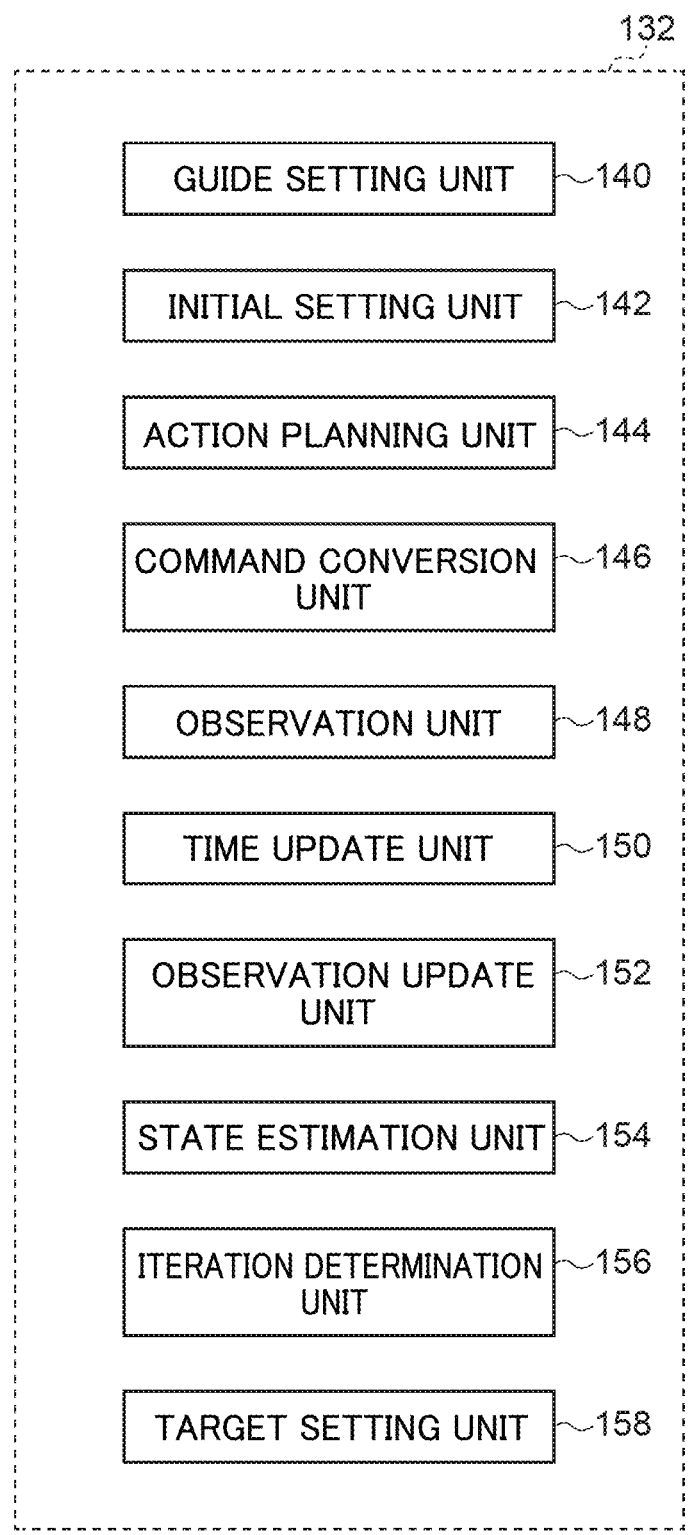
FIG. 7 is a block diagram illustrating an example of a functional configuration of an execution unit of the control device.

Specifically, as illustrated in FIG. 7, the execution unit 132 includes a guide setting unit 140, an initial setting unit 142, an action planning unit 144, a command conversion unit 146, an observation unit 148, a time update unit 150, an observation update unit 152, a state estimation unit 154, an iteration determination unit 156, and a target setting unit 158. Note that the target setting unit 158 is an example of a target state setting unit, the time update unit 150 is an example of a particle set setting unit, the observation update unit 152 is an example of a particle set adjustment unit, the command conversion unit 146 is an example of an action unit, and the iteration determination unit 156 is an example of a processing control unit.

The guide setting unit 140 sets a guide. The guide is a final part of the relative trajectory of the operation target object with respect to the object of interest, and is a trajectory that is a common target relative trajectory regardless of the initial relative position of the operation target object with respect to the object of interest. The guide includes a completion state and a series of intermediate target states to the completion state. Here, the completion state and the intermediate target states are represented by the object coordinate system.

For example, the guide setting unit 140 creates a guide for the unit state transition data on the basis of an assembly procedure in the registration information. Here, the guide is a series of discrete relative positions and postures leading to the completion state. The completion state is an end of the guide.

The guide setting unit 140 may be provided in the operation planning device 20. In this case, the control device 30 is caused to acquire the guide similarly to the unit state transition data.

Hereinafter, an example of a guide creation method will be described.

Figure 8:
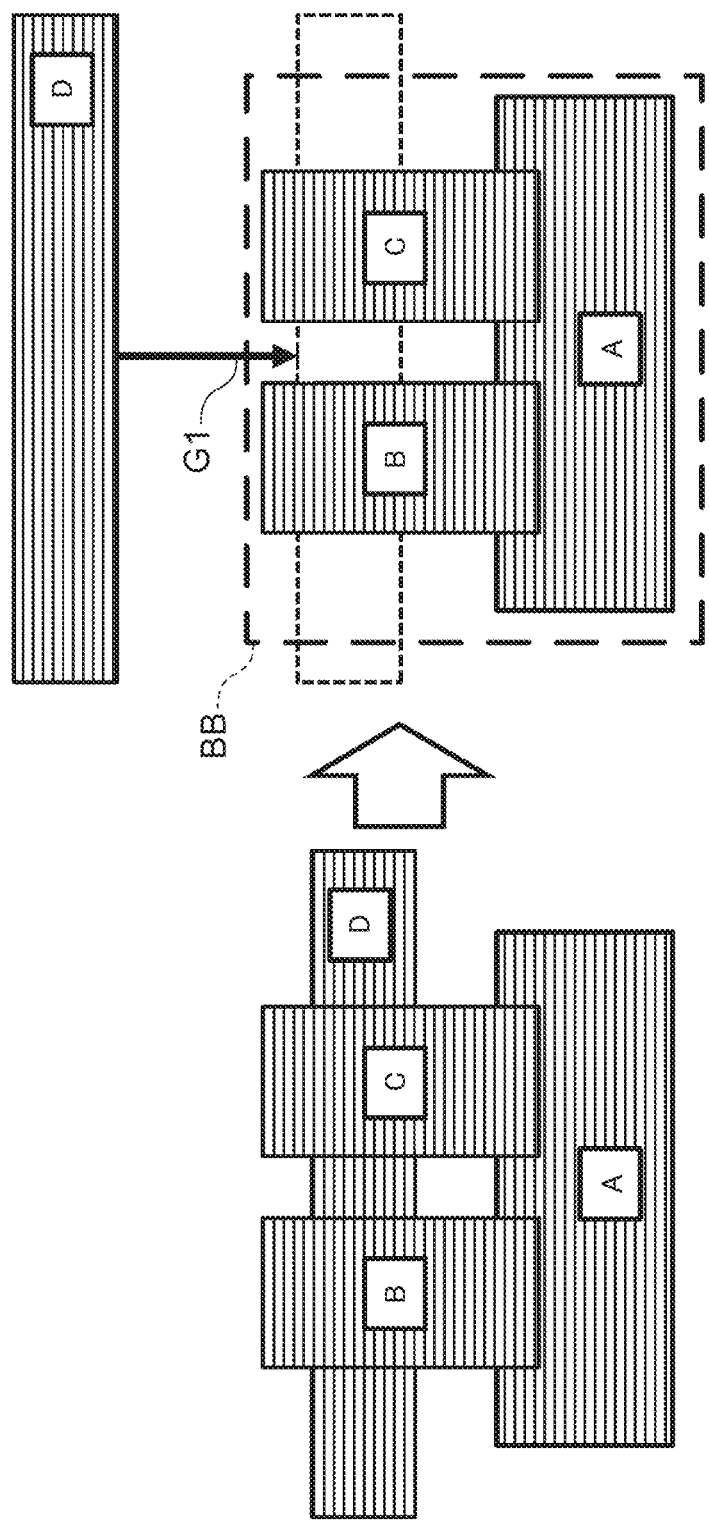
FIG. 8 is a diagram for explaining a method of generating a guide.

FIG. 8 is an example of a locus of a position and a posture of a component D in a case where the component D is moved in a direction in which the component D is movable without interfering with an assembly of components A to C from a state in which the component D is assembled to the assembly of the components A to C. A locus obtained by reversing the moving direction starting from an end point of the locus is created as a guide G1. The intervals between the states constituting the guide do not need to be uniform, and the state may be densely set, for example, in a region where contact is expected.

The initial setting unit 142 sets the intermediate target state in the guide farthest from the completion state as a target state of the current movement.

Furthermore, the initial setting unit 142 initializes a set of particles representing uncertainty of the position and posture of the operation object, in which each particle included in the set of particles represents one of possible positions and postures of the operation object. Here, the position and posture of the operation object represented by the particle are represented by the object coordinate system.

The action planning unit 144 plans an action for moving the operation object from the initial state or an estimated state to be described later to a target state of the current movement. Here, the estimated state and the action are represented by the object coordinate system.

The command conversion unit 146 converts the planned action into a command that can be executed by the robot 10, outputs the command, and commands the robot 10.

The observation unit 148 acquires, from the state observation data acquired by the acquisition unit 130, an observation result regarding the relative position and posture of the object of interest and the operation object. Here, the observation unit 148 acquires the relative position and posture of the object of interest and the operation object as the observation result represented by the object coordinate system.

Furthermore, the observation unit 148 acquires an observation result regarding the presence or absence of contact between the operation object and the object of interest from the contact observation data acquired by the acquisition unit 130. Specifically, the contact observation data is converted into binary values corresponding to contact or non-contact, and is recognized as a contact observation value. The method of converting the sensor value into the binary value is not limited, and an existing method may be used.

The time update unit 150 updates the set of particles in the next step.

The observation update unit 152 updates a weight of each particle included in the set of particles. At this time, a weight of the particle is updated more greatly as the particle represents a position and a posture closer to a position and a posture of the operation object indicated by the observation result among the particles, and a weight of a corresponding particle is updated more greatly as the state is closer to a state in which the object of interest and the operation object arranged in a position and a posture represented by each of particles are in contact with each other in a virtual space where shapes and relative positional relationship of the object of interest and the operation object are expressed in a case in which the observation result indicates that contact has occurred. Here, the virtual space is a space described by the object coordinate system.

The state estimation unit 154 calculates an estimated state that is a position and a posture of the operation object estimated on the basis of the set of particles in which the weight of each particle is adjusted.

The iteration determination unit 156 determines whether or not the estimated state to be calculated coincides with the completion state within a predetermined error. Furthermore, the iteration determination unit 156 repeats each processing of the target setting unit 158, the action planning unit 144, the command conversion unit 146, the observation unit 148, the time update unit 150, the observation update unit 152, and the state estimation unit 154 until the estimated state coincides with the completion state within a predetermined error.

The target setting unit 158 sequentially sets the intermediate target states in the guide from the far side to the near side with respect to the completion state as the target states of the current movement, and sets the completion state as the final target state of the current movement.

Next, an operation of the control system 1 will be described.

FIG. 9 is a sequence diagram illustrating a flow of a process of the control system 1 of the present embodiment. The CPU 20A functions as each unit of the operation planning device 20 to perform operation planning processing, and the CPU 30A functions as each unit of the control device 30 to perform control processing.

In step S100, the operation planning device 20 creates state transition data and control data each including the unit state transition data. The control data is each piece of gripping data corresponding to each of the created unit state transition data.

In step S102, the operation planning device 20 outputs the state transition data and the control data to the state transition control unit 25.

In step S104, the state transition control unit 25 receives a series of task start instructions and starts a task to be processed. When the task start instructions are received, the first task to be processed is started, and the task is sequentially updated according to the progress of the task. Note that the task start instructions may be received by the control device 30.

In step S108, the state transition control unit 25 outputs the unit state transition data corresponding to the task to be processed and the control data corresponding to the unit state transition data to the control device 30. Note that the state transition control unit 25 first outputs unit state transition data corresponding to the first task in the order of the repetitive processing, and outputs unit state transition data corresponding to the next task according to the progress of the task.

In step S114, the acquisition unit 130 of the control device 30 acquires the state observation data and the contact observation data observed by the state observation sensor 14 and the contact observation sensor 16, and the execution unit 132 executes the task to be processed. As a result, the robot 10 is controlled to transition the task from the initial state in which the operation object to be operated is away from the object of interest located in the environment to the completion state in which the operation object is in contact with the object of interest in a specific manner.

In step S118, the execution unit 132 of the control device 30 notifies the state transition control unit 25 of task completion.

In step S120, the state transition control unit 25 determines whether or not the process has been ended up to the final state of the state transition data. In a case in which it is determined that the process has ended up to the final state, the process proceeds to step S124. In a case in which it is determined that the process has not been ended up to the final state, the process proceeds to step S122.

In step S122, the state transition control unit 25 updates the task to be processed, and the process returns to step S108. The task update is processing of updating a task to be processed to a next task. In step S108 after the task update, the unit state transition data and the control data (gripping data) corresponding to the task to be processed are output to the control device 30, and the subsequent processing is repeated.

In step S124, the state transition control unit 25 ends the task and ends the process of the control system 1.

FIG. 10 is a flowchart illustrating a flow of control processing of the control device 30 in step S114.

In step S130, the guide setting unit 140 generates and sets a guide for the unit state transition data on the basis of the assembly procedure of the registration information. Specifically, a start state $s_0^*$ and an end state $s_M^*$ with respect to the relative position and posture of the object of interest and the operation object are determined, and a set of M+1 states is determined as a guide.

$$s_{0:M}^* = \{s_m^* | m=0,1,\ldots,M\}$$

Here, a set of the states $s_{0:M}^*$ is a guide, and the guide is generated by utilizing CAD models of the object of interest and the operation object. For example, as described with reference to FIG. 8, in the CAD model, a locus of the position and posture of the operation object when the operation object is gradually moved in M stages in the direction in which the operation object can move without interfering with the object of interest is created starting from the state in which the operation object is assembled to the object of interest in the end state. Then, the locus obtained by reversing the moving direction starting from the end point of the locus is generated as a guide. The intervals between the states constituting the guide do not need to be uniform, and the state may be densely set, for example, in a region where contact is expected.

In step S132, the initial setting unit 142 sets an initial value of the target state to the state $s_0^*$ of the start point of the guide.

In step S134, the observation unit 148 acquires the relative position and posture of the operation object from the state observation data obtained by the state observation sensor 14.

In step S136, the initial setting unit 142 determines an initial value of a set of particles which is a set of arbitrary N states at initial time t=0 as expressed by the following formula.

$$\Xi_0 \in \{s_0^{(n)} | n=0,1,\ldots,N-1\}$$

An initial value $s_0^{(n)}$ of the particle may be determined by some prior knowledge. For example, the initial value $s_0^{(n)}$ may be determined so as to be uniformly distributed in a region within a range of the maximum error assumed for the observation value of the relative position and posture of the operation object.

Here, the set of particles represents uncertainty of the relative position and posture of the operation object. Each of the particles represents one of possible relative positions and postures of the operation object.

An estimated value $\hat{s}_t$ of the state is a relative position and posture representing the set of particles.

Furthermore, an initial value of a set of N particle weights expressed by the following formula, which respectively correspond to the N particles, is determined.

$$W \in \{W^{(n)} | n=0,1,\ldots,N-1\}$$

In the initial value, all weights are set to $w^{(n)}=1/N$.

Finally, a probability distribution P, for generating a particle dispersion variable φ used for the time update of the particles is determined.

$$\Phi \sim P_\Phi \qquad (10)$$

The particle dispersion variable φ corresponds to a virtually assumed system noise.

In step S138, the action planning unit 144 determines a movement amount $a_t$ in the object coordinate system from $s_{t+1}^*$ and the estimated value $\hat{s}_t$ of the current state when the current element is $s_t^*$ and the element of the next step is $s_{t+1}^*$ among the elements $s_m^*$ of the set of states constituting the guide.

$$a_t = s_{t+1}^* \hat{s}_t^{-1} \qquad (11)$$

Note that the superscript "^ (hat)" of X in the mathematical formula is represented as ^X.

The estimated value $\hat{s}_t$ of the state $s_t$ is obtained in step S148 described later. The initial value of $\hat{s}_t$ is the relative position and posture acquired in step S134. Note that path planning using CAD may be performed each time to determine the movement amount. In a case in which the guide is not used, the state $s_t$ and the position and posture $x_t$ have a relationship of $s_t = T_t x_t$ with the current state as a starting point as described in Formula (1). Based on this relationship, as described in Formula (12), the homogeneous transformation matrix $\hat{T}_t$ that transforms the estimated state $\hat{s}_t$ and the value $x_t$ of the position and posture of the TCP in the robot coordinate system is obtained. $\hat{T}_t$ corresponds to an estimated value of $T_t$.

$$\hat{s}_t = \hat{T}_t x_t$$

$$\hat{T}_t = \hat{s}_t x_t^{-1} \qquad (12)$$

The operation object is moved by the determined movement amount $a_t$. When the robot 10 moves the operation object, the robot 10 is controlled by $\hat{u}_t$ by converting the movement amount $a_t$ into the control amount $\hat{u}_t$ for the TCP using the estimated $\hat{T}_t$.

$$\hat{u}_t = \hat{T}_t^{-1} a_t \hat{T}_t \tag{13}$$

However, in practice, the system noise $v_t$ occurs, so that the operation object moves by $v_t a_t$. The actual control amount $u_t$ is obtained by converting the movement $v_t a_t$ of the net relative position and posture into the TCP movement amount of the robot coordinate system. However, since $v_t$ is unknown and $u_t$ cannot be obtained, the control is performed using $\hat{u}_t$.

In step S140, the command conversion unit 146 converts the movement amount $\hat{u}_t$ of the TCP in the robot coordinate system into a command amount of rotation of each joint of the robot 10 by inverse kinematics, and commands the robot 10 to take an action.

In step S142, the observation unit 148 obtains, from the state observation data and the contact observation data obtained from the state observation sensor 14 and the contact observation sensor 16, an observation value $y_t = (s_t', c_t')$ in which the relative position and posture of the object coordinate system and the contact state between the object of interest and the operation object are integrated.

Furthermore, $x_t$ is obtained as a value of the position and posture of the TCP in the robot coordinate system by Forward Kinematics using a measurement value of an angle of each joint of the robot 10 by the encoder.

In step S144, after the action in step S140, the time update unit 150 updates the following set of particles $$\Xi_t$$

to the following with $a_t$ and the particle dispersion variable $\varphi_t$.

$$\Xi_{t+1,t+1} \in \{s_{t+1}^{(n)} | n=0,1,\ldots,N-1\}$$

Furthermore, the particle weight is normalized to 1/N.

$$s_{t+1}^{(n)} = \varphi_t^{(n)} a_t s_t^{(n)} \tag{14}$$

$$\omega^{(n)} \leftarrow 1/N \tag{15}$$

In step S146, the observation update unit 152 updates the weight of each particle included in the set of particles.

Specifically, first, interference determination is performed as follows. An object of interest depicted using shape data of CAD is disposed in a simulation space (virtual space) for performing interference determination. Moreover, for each particle included in the set of particles, the operation object having the position and posture represented by the particle is disposed in the simulation space using the shape data of CAD. When there is a portion where the operation object disposed based on a certain particle overlaps the object of interest, it is determined that there is interference, and when the operation object and the object of interest are separated and there is no portion where the operation object and the object of interest overlap, it is determined that there is no interference. In this manner, the presence or absence of interference is determined for each particle. Furthermore, an interference distance, which is the closest distance between a surface of the object of interest and a surface of the operation object in the simulation, is also calculated.

Thus, using the following set of particles, $$\Xi_t \in \{s_t^{(n)} | n=0,1,\ldots,N-1\}$$

interference determination is performed using CAD in simulation to obtain the following set of interference determinations.

$$\{c_t^{(n)} | n=0,1,\ldots,N-1\}$$

The interference determination is performed to obtain a set of interference distances expressed by the following formula.

$$\{d_t^{(n)} | n=0,1,\ldots,N-1\}$$

The interference determination $c_t^{(n)}$ is the presence or absence of interference between the object of interest and the operation object of the n-th particle on simulation, and $c_t^{(n)}=0$ at the time of interference and $c_t^{(n)}=1$ at the time of non-interference.

The interference distance $d_t^{(n)}$ is the shortest distance between the surface of the object of interest and the surface of the operation object of the n-th particle in the simulation, and is $d_t^{(n)}<0$ at the time of interference and $d_t^{(n)}>0$ at the time of non-interference.

A likelihood $L(y_t | s_t^{(n)})$ corresponding to a probability $p(y_t | s_t^{(n)})$ is determined by Formula (16). $l(s_t^{(n)} | s_t')$ is a distance between the state of the particle and the observed state. $\delta(\cdot)$ is a delta function, and i and a are hyperparameters.

$$\mathcal{L}(y_t | s_t^{(n)}) = \begin{cases} \dfrac{\delta(c_t^{(n)}, c_t')}{\sum_{n=0}^{N-1} \delta(c_t^{(n)}, c_t')} \cdot \exp\left[-\left(\dfrac{l(s_t^{(n)}, s_t')}{\sigma}\right)^2\right] & (c_t' = 0) \\ \dfrac{\exp[-(d_t^{(n)}/\tau)^2]}{\sum_{n=0}^{N-1} \exp[-(d_t^{(n)}/\tau)^2]} \cdot \exp\left[-\left(\dfrac{l(s_t^{(n)}, s_t')}{\sigma}\right)^2\right] & (c_t' = 1) \end{cases} \tag{16}$$

That is, the upper formula of Formula (16) is used in a case in which there is no actual contact ($c_t'=0$) between the object of interest and the operation object detected by the contact observation sensor 16, and the lower formula is used in a case in which there is actual contact ($c_t'=1$). The delta function included in the formula for no actual contact returns a value of 1 for a particle with no interference in the simulation and returns a value of 0 for a particle with interference.

A portion of the exponential function included in the Formula (16) is a Gaussian function. The function system may not be a Gaussian function, and a function having a high likelihood when the distance is short and a low likelihood when the distance is long may be used. For example, exponential decay or the like may be used.

The particle weight W is updated by Formula (17) using the likelihood value obtained from the likelihood function.

$$\omega^{(n)} \leftarrow \mathcal{L}(s_t^{(n)} | y_t) \omega^{(n)} \tag{17}$$

That is, in a case in which there is no actual contact between the object of interest and the operation object, the likelihood function sets the weight of the particle with interference in simulation (particle contrary to the observation result without contact) to 0, and increases the weight of the particle with no interference in simulation as the state $s_t^{(n)}$ of the particle is closer to the observed state $s_t'$ of the operation object.

On the other hand, in a case in which there is actual contact between the object of interest and the operation object, the likelihood function has an action of increasing the weight of the particle as the state $s_t^{(n)}$ of the particle is closer to the observed state $s_t'$ of the operation object, and an action of increasing the weight of the particle as the shortest distance between the surface of the object of interest and the surface of the operation object is shorter. As a result, in a case in which there is actual contact, the weight of the particle representing the state close to the state in which the surfaces of the object of interest and the operation object are in contact with each other in simulation is updated to be large, and the weight of the particle representing the state in which the operation object is far from the object of interest or the operation object deeply enters the object of interest is updated to be small.

In step S148, the state estimation unit 154 calculates an estimated state that is the position and posture of the operation object estimated on the basis of the set of particles for which the weight of each particle has been adjusted. At this time, as described above, the estimated value $\hat{s}_t$ of the state of the operation object is corrected so as to approach the observed position and posture of the operation object, and in a case in which the actual contact is observed by the contact observation sensor 16, the estimated value $\hat{s}_t$ is corrected so as to approach the state in which the surfaces of the operation object and the object of interest are in contact with each other also in the simulation.

Specifically, the estimated value $\hat{s}_t$ of the state at time t is obtained from Formula (18) as an expected value for the set of particles. In Formula (18), log represents the logarithm of the matrix, and exp represents the exponent of the matrix.

$$\hat{s}_t = E[\Xi_t] \qquad (18)$$
$$= \exp\left[\sum_{n=0}^{N-1} w^{(n)} \log[s_t^{(n)}]\right]$$

With a probability proportional to the following updated particle weight $W \in \{w^{(n)} | n=0,1,\ldots,N\}$, from the following set of particles $\Xi_t \in \{s_t^{(n)} | n=0,1,\ldots,N\}$ the particles are randomly selected to perform resampling of
$\Xi_t$.

In step S150, the iteration determination unit 156 determines whether or not the estimated value $\hat{s}_t$ of the state coincides with the end state $s_M^*$ of the guide within a predetermined error range. When the estimated value $\hat{s}_t$ of the state coincides with the end state $s_M^*$ of the guide within the predetermined error range, the control processing ends. When they do not coincide with each other, the processing proceeds to S152.

In step S152, the target setting unit 158 sets the target state to the next state in the guide. Furthermore, the time is advanced by one step, and previous t+1 is set as new t. Then, the processing returns to step S138.

Note that the order of the processing illustrated in the flowchart of FIG. 10 may be appropriately changed as long as the object can be achieved. For example, the observation in step S142 may be performed after step S144.

Furthermore, the robot 10 may be controlled as follows for a portion to be moved from the position where the operation object is gripped to the guide start point.

First, the movement path from the position where the operation object is gripped to the guide start point is connected by a straight line or created using a conventional motion planning method. Furthermore, the movement of the operation object from the place where the operation object is gripped to the guide start point is performed as follows, for example.

First, the position and posture of the object of interest in the camera coordinate system are observed from the state observation data obtained by the camera of the state observation sensor 14, and a virtual space having the object coordinate system that is a coordinate system based on the object of interest is developed. As a result, the camera coordinate system and the object coordinate system can be transformed from each other.

The guide is then placed in the virtual space. Here, the guide represents the trajectory of the operation object, not the end effector 12.

Next, from the state observation data obtained by the camera, the position and posture of the operation object before gripping in the camera coordinate system are observed and transformed into the position and posture of the object coordinate system to dispose the operation object in the virtual space. Then, the position and posture of the end effector 12 in the robot coordinate system are acquired from the state observation data obtained by the encoder.

Next, the position and posture of the end effector 12 in the camera coordinate system are observed from the state observation data obtained by the camera, and transformed into the position and posture of the object coordinate system to dispose the end effector 12 in the virtual space. As a result, the robot coordinate system and the object coordinate system can be transformed. When the association between the camera coordinate system and the robot coordinate system is calibrated in advance, the observation of the end effector 12 by the camera can be omitted.

Next, the operation object is gripped by the end effector 12.

The position and posture of the operation object in the camera coordinate system are observed from the state observation data obtained by the camera after the gripping, and the position and posture of the operation object in the object coordinate system are corrected. As a result, the gripping error is eliminated.

Then, in the virtual space, a path of movement of the operation object from the initial position and posture when the operation object is gripped to the position and posture at the guide start point is planned.

Next, the path plan in the virtual space is transformed into a path plan in the robot coordinate system space, and the operation object is moved according to the path plan. Note that the error is not eliminated during the movement.

Then, the position and posture of the operation object and the end effector 12 after the movement are acquired from the state observation data obtained by the camera, and the operation object is moved so as to coincide with the position and posture at the guide start point. A transformation relationship among the camera coordinate system, the object coordinate system, and the robot coordinate system is corrected. As a result, the position and posture error of the operation object at the guide start point is eliminated. Furthermore, a transformation error between the coordinate systems is also reduced.

As described above, according to the control system 1 of the present embodiment, the set of particles for the relative position and posture of the two objects is assumed, the likelihood of each particle is obtained from the observation information and the likelihood function, and the relative position and posture is estimated. The movement amount of the object is determined from the estimated relative position and posture and the target relative position and posture at the next time. A homogeneous transformation matrix for transforming the estimated relative position and posture into the position and posture of the TCP in the robot coordinate system is obtained, the movement amount of the object is transformed into the movement amount of the TCP from the transformation matrix to control the robot 10, and the relative position and posture of the two objects are brought to the target relative position and posture. At this time, the relative position and posture of the two objects are estimated by the contact detection result between the objects and the interference determination simulation using CAD using the information that the operation object and the object of interest have come into contact with each other, and the movement amount of the operation object is determined from the estimation result. As a result, it is possible to operate the object using the robot 10 in an uncertain environment where noise is added to observation and action, and to accurately bring the relative position and posture of the two objects to the target state. Furthermore, even in an environment where the relative position and posture between the end effector 12 and the operation object are unknown and the control that changes during the control is uncertain, or in an environment where the observation that the recognition of the relative position and posture by the state observation sensor 14 includes an error is uncertain, it is possible to bring the relative position and posture between the two objects to the target state.

Note that the operation planning processing or the control processing executed by the CPU reading software (a program) in the above embodiment may be executed by various processors other than the CPU. Examples of the processor in this case include a programmable logic device (PLD) in which a circuit configuration can be changed after manufacturing a field-programmable gate array (FPGA) or the like, a dedicated electric circuit that is a processor having a circuit configuration exclusively designed for executing specific processing such as an application specific integrated circuit (ASIC), and the like. Furthermore, the operation plan processing or the control processing may be executed by one of these various processors, or may be executed by a combination of two or more processors of the same type or different types (for example, a plurality of FPGAs, a combination of a CPU and an FPGA, and the like). Furthermore, more specifically, the hardware structure of these various processors is an electric circuit in which circuit elements such as semiconductor elements are combined.

Furthermore, in the above embodiment, the aspect in which the program is stored (installed) in advance in the ROM 20B (30B) or the storage 20D (30D) has been described, but the present disclosure is not limited thereto. The program may be provided in a form of being recorded in a recording medium such as a compact disk read only memory (CD-ROM), a digital versatile disk read only memory (DVD-ROM), or a universal serial bus (USB) memory. Furthermore, the program may be downloaded from an external device via a network.

Furthermore, in the above embodiment, the case where the end effector 12 is the gripper having the clamping portion 12a or the suction pad has been described as an example, but the present disclosure is not limited thereto. Other configurations may be adopted as long as the configuration holds the object, and for example, the end effector 12 may be a vacuum suction chuck, a magnetic suction chuck, a spatula for scooping the object, or the like.

Furthermore, the case where the guide is generated from the completion state of the unit state transition data has been described as an example, but the present disclosure is not limited thereto. Not only the completion state but also a series of discrete relative position and posture leading to the completion state may be given as the unit state transition data.

Furthermore, the case where the sequence of the relative positions and postures is automatically generated as the guide has been described as an example, but the guide may not be generated. In this case, in the above embodiment, it may be regarded as a special case where the guide is configured in a single state.

Furthermore, the guide may be a series of discrete relative positions and postures leading to a state that is not a completion state.

Furthermore, the task may be a task of gripping a component that is an object of interest. In the above embodiment, the object located in the environment is the object of interest, and the object gripped by the end effector 12 is the operation object. However, in the task of gripping the component, the object placed in the environment to be operated (gripped) by the end effector 12 is the object of interest, and the end effector 12 itself is the operation object. Since the end effector 12 is operated by a robot arm, the end effector 12 can also be regarded as an object operated by a robot. In the task of gripping the component, a state in which the end effector 12, which is an operation object, grips the object of interest placed in the environment and has not yet moved the object of interest is a completion state.

(Supplement)

With regard to the above embodiments, the following supplementary notes are further disclosed.

(Supplement 1)

A robot control device that controls a robot that operates an operation object to be operated to transition from a state in which the operation object is away from an object of interest located in an environment to a completion state in which the operation object is in contact with the object of interest in a specific manner, the robot control device including:

a memory; and at least one processor connected to the memory, in which the processor sets an intermediate target state or the completion state as a target state of current movement, the intermediate target state being a target state in a middle of movement of the operation object until reaching the completion state, acquires an observation result by a sensor regarding a position and a posture of the operation object and presence or absence of contact between the operation object and the object of interest, sets a set of particles representing uncertainty of the position and the posture of the operation object, each of the particles included in the set of particles representing one of possible positions and postures of the operation object, increases a weight of a particle for a particle representing a position and a posture closer to a position and a posture of the operation object indicated by the observation result among the particles, and increases a weight of a corresponding particle for a particle closer to a state in which the object of interest and the operation object arranged in a position and a posture represented by each of the particles are in contact with each other in a virtual space where shapes and a relative positional relationship of the object of interest and the operation object are expressed in a case in which the observation result indicates that the contact has occurred, calculates an estimated state that is a position and a posture of the operation object estimated based on the set of particles in which a weight of each of the particles is adjusted, plans an action for moving the operation object from the estimated state to the target state of the current movement, commands the robot to execute the planned action, and repeats setting of the target state, acquisition of the observation result, setting of the set of particles, adjustment of the set of particles, calculation of the estimated state, planning of the action, and execution of the action until the estimated state coincides with the completion state within a predetermined error.

(Supplement 2)

Anon-transitory storage medium storing a program that can be executed by a computer to execute robot control processing for controlling a robot that operates an operation object to be operated to transition from a state in which the operation object is away from an object of interest located in an environment to a completion state in which the operation object is in contact with the object of interest in a specific manner, the robot control processing includes:

setting an intermediate target state or the completion state as a target state of current movement, the intermediate target state being a target state in a middle of movement of the operation object until reaching the completion state;

acquiring an observation result by a sensor regarding a position and a posture of the operation object and presence or absence of contact between the operation object and the object of interest;

setting a set of particles representing uncertainty of the position and the posture of the operation object, each of the particles included in the set of particles representing one of possible positions and postures of the operation object;

increasing a weight of a particle for a particle representing a position and a posture closer to a position and a posture of the operation object indicated by the observation result among the particles, and increasing a weight of a corresponding particle for a particle closer to a state in which the object of interest and the operation object arranged in a position and a posture represented by each of the particles are in contact with each other in a virtual space where shapes and a relative positional relationship of the object of interest and the operation object are expressed in a case in which the observation result indicates that the contact has occurred;

calculating an estimated state that is a position and a posture of the operation object estimated based on the set of particles in which a weight of each of the particles is adjusted;

planning an action for moving the operation object from the estimated state to the target state of the current movement;

commanding the robot to execute the planned action; and repeating setting of the target state, acquisition of the observation result, setting of the set of particles, adjustment of the set of particles, calculation of the estimated state, planning of the action, and execution of the action until the estimated state coincides with the completion state within a predetermined error.

The disclosure of Japanese Patent Application No. 2021-017687 is incorporated herein by reference in its entirety.

All documents, patent applications, and technical standards described in this specification are incorporated herein by reference to the same extent as if each individual document, patent application, and technical standard were specifically and individually described to be incorporated by reference.

The invention claimed is:

1. A robot control device that controls a robot that operates an operation object to be operated, to transition from a state in which the operation object is away from an object of interest located in an environment to a completion state in which the operation object is in contact with the object of interest in a specific manner, the robot control device comprising:

a target state setting unit that sets an intermediate target state or the completion state as a target state of current movement, the intermediate target state being a target state in a middle of movement of the operation object until reaching the completion state;

an observation unit that acquires an observation result via a sensor regarding a position and a posture of the operation object and presence or absence of contact between the operation object and the object of interest;

a particle set setting unit that sets a set of particles representing uncertainty of the position and the posture of the operation object, each of the particles included in the set of particles representing one of possible positions and postures of the operation object;

a particle set adjusting unit that increases a weight of a particle for a particle representing a position and a posture closer to a position and a posture of the operation object indicated by the observation result among the particles, and increases a weight of a corresponding particle for a particle closer to a state in which the object of interest and the operation object arranged in a position and a posture represented by each of the particles are in contact with each other in a virtual space where shapes and a relative positional relationship of the object of interest and the operation object are expressed in a case in which the observation result indicates that the contact has occurred;

a state estimation unit that calculates an estimated state that is a position and a posture of the operation object estimated based on the set of particles in which a weight of each of the particles is adjusted;

an action planning unit that plans an action for moving the operation object from the estimated state to the target state of the current movement;

an action unit that commands the robot to execute the planned action; and a processing control unit that repeats setting of the target state, acquisition of the observation result, setting of the set of particles, adjustment of the set of particles, calculation of the estimated state, planning of the action, and execution of the action until the estimated state coincides with the completion state within a predetermined error.

2. The robot control device according to claim 1, further comprising a guide setting unit that sets a guide including the completion state and a series of intermediate target states until reaching the completion state, wherein the target state setting unit sequentially sets the intermediate target states in the guide from a far side to a near side with respect to the completion state as target states of the current movement, and sets the completion state as a final target state of the current movement.

3. The robot control device according to claim 1, wherein:
the completion state, the intermediate target state, the position and the posture of the operation object represented by the particle, the estimated state, and the action are represented by an object coordinate system that is a relative coordinate system based on the object of interest,
the virtual space is a space described by the object coordinate system,
the observation unit provides the position and the posture of the operation object detected by the sensor as an observation result represented by the object coordinate system, and
the action unit converts the action into a command that can be executed by the robot, and outputs the command.

4. The robot control device according to claim 1, wherein the operation object is an object to be operated by an end effector of the robot.

5. The robot control device according to claim 1, wherein the operation object is an end effector attached to an arm of the robot, and the object of interest is an object to be held for which holding by the end effector is completed in the completion state.

6. A robot control method of controlling a robot that operates an operation object to be operated to transition from a state in which the operation object is away from an object of interest located in an environment to a completion state in which the operation object is in contact with the object of interest in a specific manner, the robot control method causing a computer to execute processing comprising:

setting an intermediate target state or the completion state as a target state of current movement, the intermediate target state being a target state in a middle of movement of the operation object until reaching the completion state;

acquiring an observation result by a sensor regarding a position and a posture of the operation object and presence or absence of contact between the operation object and the object of interest;

setting a set of particles representing uncertainty of the position and the posture of the operation object, each of the particles included in the set of particles representing one of possible positions and postures of the operation object;

increasing a weight of a particle for a particle representing a position and a posture closer to a position and a posture of the operation object indicated by the observation result among the particles, and increasing a weight of a corresponding particle for a particle closer to a state in which the object of interest and the operation object arranged in a position and a posture represented by each of the particles are in contact with each other in a virtual space where shapes and a relative positional relationship of the object of interest and the operation object are expressed in a case in which the observation result indicates that the contact has occurred;

calculating an estimated state that is a position and a posture of the operation object estimated based on the set of particles in which a weight of each of the particles is adjusted;

planning an action for moving the operation object from the estimated state to the target state of the current movement;

commanding the robot to execute the planned action; and repeating setting of the target state, acquisition of the observation result, setting of the set of particles, adjustment of the set of particles, calculation of the estimated state, planning of the action, and execution of the action until the estimated state coincides with the completion state within a predetermined error.

7. A non-transitory storage medium storing a robot control program for controlling a robot that operates an operation object to be operated, to transition from a state in which the operation object is away from an object of interest located in an environment to a completion state in which the operation object is in contact with the object of interest in a specific manner, the robot control program being executable by a computer to perform processing comprising:

setting an intermediate target state or the completion state as a target state of current movement, the intermediate target state being a target state in a middle of movement of the operation object until reaching the completion state;

acquiring an observation result by a sensor regarding a position and a posture of the operation object and presence or absence of contact between the operation object and the object of interest;

setting a set of particles representing uncertainty of the position and the posture of the operation object, each of the particles included in the set of particles representing one of possible positions and postures of the operation object;

increasing a weight of a particle for a particle representing a position and a posture closer to a position and a posture of the operation object indicated by the observation result among the particles, and increasing a weight of a corresponding particle for a particle closer to a state in which the object of interest and the operation object arranged in a position and a posture represented by each of the particles are in contact with each other in a virtual space where shapes and a relative positional relationship of the object of interest and the operation object are expressed in a case in which the observation result indicates that the contact has occurred;

calculating an estimated state that is a position and a posture of the operation object estimated based on the set of particles in which a weight of each of the particles is adjusted;

planning an action for moving the operation object from the estimated state to the target state of the current movement;

commanding the robot to execute the planned action; and repeating setting of the target state, acquisition of the observation result, setting of the set of particles, adjustment of the set of particles, calculation of the estimated state, planning of the action, and execution of the action until the estimated state coincides with the completion state within a predetermined error.

* * * * *